APPARATUS FOR TWISTING AND PLYING STRANDS

Original Filed Sept. 9, 1964 3 Sheets-Sheet 1

APPARATUS FOR TWISTING AND PLYING STRANDS

Original Filed Sept 9, 1964 3 Sheets-Sheet 2

APPARATUS FOR TWISTING AND PLYING STRANDS

Original Filed Sept. 9, 1964 3 Sheets-Sheet 3

United States Patent Office

Re. 26,757
Reissued Jan. 6, 1970

26,757
APPARATUS FOR TWISTING AND PLYING STRANDS

Alfred W. Vibber, 560 Riverside Drive,
New York, N.Y. 10027

Original No. 3,295,304, dated Jan. 3, 1967, Ser. No. 395,195, Sept. 9, 1964. Application for reissue Dec. 30, 1968, Ser. No. 799,138
Int. Cl. D01h *7/90, 1/10;* D07h *3/04*
U.S. Cl. 57—58.3 42 Claims

Matter enclosed in heavy brackets [ ] appears in the original patent but forms no part of this reissue specification; matter printed in italics indicates the additions made by reissue.

*ABSTRACT OF THE DISCLOSURE*

*A strand twisting and/or plying apparatus having a spindle of the loop or balloon creating type, such apparatus including mechanism for controlling the tension of the strand in the loop. Such mechanism includes first and second means to feed the strand in first and second runs toward and away from the loop, respectively, one of the first and second means being driven at variable speed to vary the speed of travel of the respective run of the strand. The speed of the variable speed strand feeding means is controlled by a differential mechanism of which one branch shaft is connected to the variable speed strand feeding means, there being means responsive to variations in the tension of the other run of strand for varying the speed of rotation of the other branch shaft of the differential mechanism.*

This invention relates to an apparatus for twisting strands, to rotating loop or balloon control mechanism for such apparatus, and in certain aspects thereof, particularly relates to an apparatus for plying strands together by rotating one strand about a source of supply of another strand, and plying the strands together beyond such source of the other strand.

In the embodiments illustrated herein, this invention is an improvement upon that of applicant's prior U.S. Patent No. 2,857,730, October 28, 1958. The apparatus and method of the present invention, although varying the speed of take-up of a plied cord away from the plying point in response to variations in the tension of one of the strands approaching the plying point, as does the apparatus of such patent, does so by simpler, more direct cord pulling means, which is directly driven in part by the said one strand. In the embodiment shown and described herein, such one strand is the outer, ballooned strand, the driving means for the means feeding the plied strand away from the plying point including a differential gearing mechanism which in part derives its driving power from a prime mover and in part derives its driving power and/or is governed in speed by a rotatable means which is frictionally engaged by the strand which is to be ballooned and is in direct tension transmitting relationship with the balloon or rotating loop or in frictional engagement with the rotating balloon or loop. The force of engagement between the said strand and such rotatable means is a function of the size and/or shape of the rotating loop or balloon, which in turn, in the apparatus described, is a function of the tension in such strand. Accordingly, the feeding means for the plied cord of the present invention and the means for variably driving such feeding means is simple and direct, being driven at least in part by the loop or balloon or by the strand to be ballooned, the variable driving torque imposed upon such feeding means being directly varied as a result of changes in the balloon shape and/or size and thus the tension in the ballooning strand.

It is to be understood that the balloon control aspects of the invention are applicable to a number of different types of twisting spindle, including up and downtwisters for singles strands, as well as cord forming spindles of the strand plying type.

The invention has among its objects the provision of a novel, simplified mechanism for controlling the rotating loop or balloon of a twisting spindle.

A further object of the invention is the provision of a novel simplified apparatus for twisting and/or plying strands wherein the pull exerted on the plied strand to withdraw it from the plying point is varied in accordance with tension variations in a run of strand approaching the plying point.

Another object of the invention resides in the provision, in apparatus of the type indicated, of novel variable speed take-up means for the plied strand, the cord pulling effect of such take-up means varying in accordance with variations in the size and/or shape of the rotating loop or balloon formed by such apparatus.

A further object of the invention lies in the provision of a novel apparatus for twisting and/or plying strands wherein the pull for feeding the plied cords away from the plying point is derived at least in part from the energy of rotation of the ballooning strand, and wherein such pulling force is varied in response to variations in the size and/or shape of the balloon.

The above and further objects and novel features of the invention will more fully appear from the following description when the same is read in connection with the accompanying drawings. It is to be understood, however, that the drawings are for the purpose of illustration only, and are not intended as a definition of the limits of the invention.

In the drawings, wherein like reference characters refer to like parts throughout the several views, FIG. 1 is a view in elevation of a plying spindle incorporating a first embodiment of cord take-up arrangement in accordance with the invention;

Figure 1:
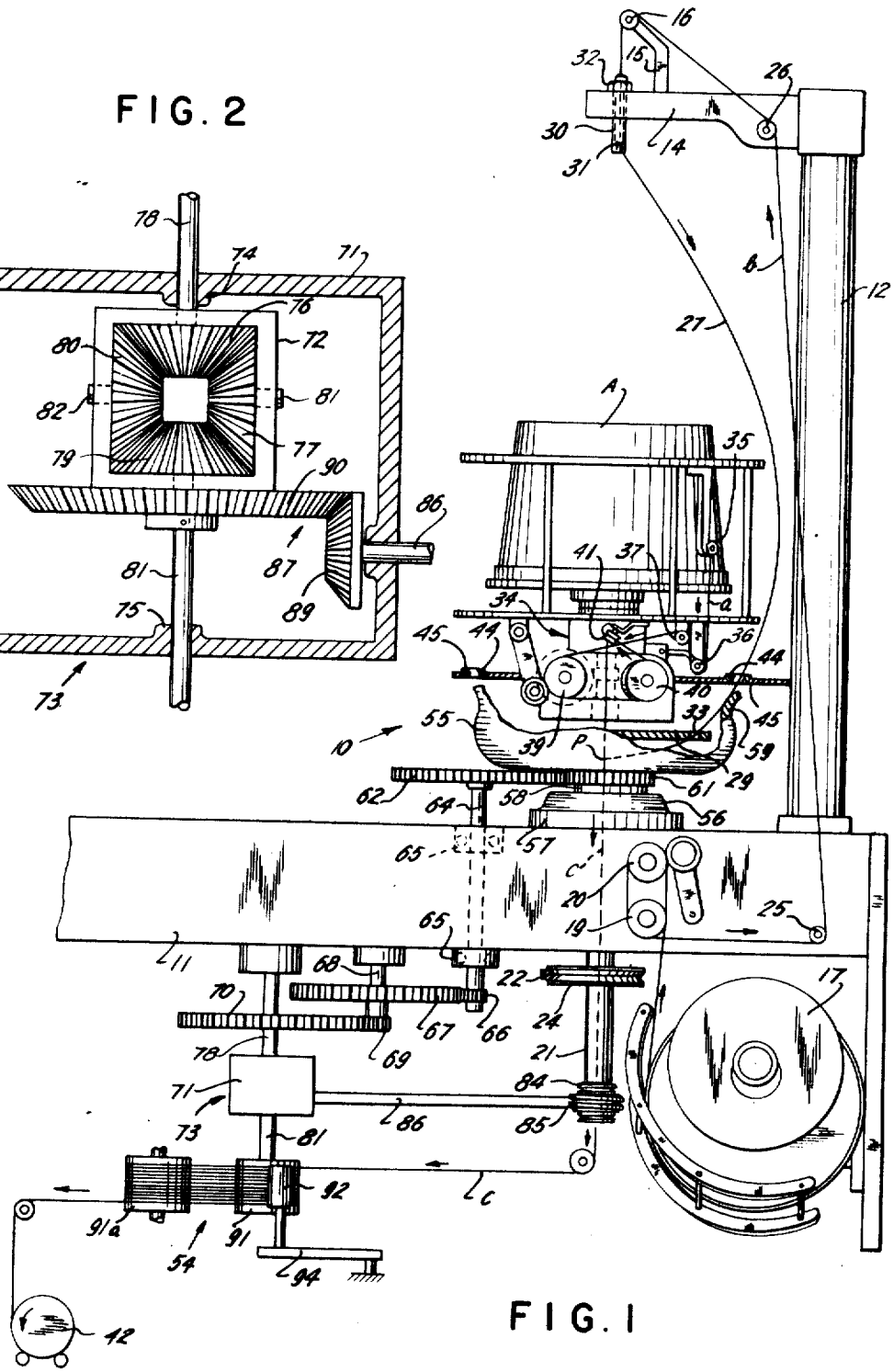

The plying spindle of the apparatus shown in FIG. 1 herein, with the exception of the variable speed means for pulling the plied cord away from the plying point and for taking it up, are essentially the same as that shown in FIGS. 1–4, inclusive, of applicant's U.S. Patent No. 2,857,730. Accordingly, such portion of the apparatus is described only briefly here, reference being had to U.S. Patent No. 2,857,730 for a more extensive description of this portion of the apparatus.

Referring now to the drawings and first particularly to FIG. 1, there is shown a spindle, generally designated 10, for plying two strands together to form a cord. Such cord is useful, for example, as a reinforcement in automobile tires and V-belts. The spindle shown is of the "skip" type, performing a strand-wrapping operation which adds no twist to the respective strands. The spindle is supported on a frame which is partially shown in FIG. 1, which comprises a support having a longitudinally extending beam 11. A post 12 extends upwardly from the beam 11 and carries on its upper end an overarm 14 having a bracket 15 with a guide pulley 16 thereon.

An outer strand package 17 is supported on a bracket which extends upwardly from the frame of the machine, the bracket rotatably supporting a holder for the package 17. The support for the package 17 carries a cage about the package, such cage mounting a guide pulley (not shown) for guiding the strand b from package 17 as such strand is delivered toward the cord-forming point or plying junction P. From such guide pulley, the strand b is led several times about an outer pair of driven strand metering rollers 19 and 20 which pull the strand b from the package 17 at a controlled rate. In the illustrative embodiment, rollers 19 and 20 are driven from the main, hollow shaft 21 of the spindle 10 through the medium of gearing which is not here shown but which is shown and described in U.S. Patent No. 2,857,730. Shaft 21 is driven by a motor (not shown) through the medium of a belt 22 which is entrained over a pulley 24 on shaft 21.

From the metering rollers 19 and 20 strand b is led about a first fixed pulley 25 and thence upwardly to a second fixed pulley 26 from which it travels to the above mentioned pulley 16. Pulley 16 has its strand-delivering surface tangential to the central axis of the inner strand package A and above the central axis of the loop or balloon 27 formed in the strand b by rotation of the shaft 21 and of the flier 29 secured thereto.

From the pulley 16, the strand b passes downwardly through a hollow shaft or spindle 30, which carries a strand guide 31 at its lower end. Preferably shaft 30 is adjustably mounted on overarm 14, being held in adjusted position by a lock nut 32. Upon leaving the guide 31, strand b passes into its loop or balloon 27 and thence past the inner package A and through a guide eyelet 33 fixed near the outer periphery of the flier disc 29. As shaft 21 is rotated, the flier disc 29 and the guide eyelet therein rotate the strand b between the flier and the guide 31 above the inner package to form the described loop or balloon 27 in the yarn about the inner package A.

The inner package A is mounted on a member 34 which is rotatably supported on shaft 21. Strand a is led from the package A about a squirrel cage around such package to a first fixed pulley 35, a floating pulley 36, and a second pulley 37, to be fed to the laterally spaced inner metering rolls 39 and 40 which advance the strand a to a canted pulley 41 to be directed downwardly through the center of the hollow rotating shaft 21. Rolls 39 and 40 are journalled in the supporting member 34. As shown in FIG. 1, roll 39 is positively driven from shaft 21 by means of a worm secured to the shaft and a meshing worm gear on the shaft carrying roll 39. Roll 40 is idle. The strand metering means made up of rolls 39 and 40, as is also the case of the metering means made up of rollers 19 and 20, are driven in synchronism with shaft 21, and tend to forward their respective strands at substantially constant speed.

The two strands, strand b passing radially inwardly from its loop or balloon 27, and strand a passing generally axially of shaft 21, meet at the plying junction or point P and are united within the shaft 21. The resulting plied cord c thus formed is pulled downwardly out of the rotating shaft 21 to be wound on a take-up package generally shown at 42. The speed of pulling of the cord c away from the plying junction P is governed by a novel variable speed take-up mechanism to be described, the strand pulling effect of such mechanism being responsive to variations in size and/or shape of the balloon and thus of the tension of the strand b in the balloon.

Means are provided to prevent the supporting structure 34 for the metering rolls 39 and 40 and their appurtenant mechanism from rotating as the shaft 21 is rotated. Thus cooperating magnets 44 and 45, positioned respectively on member 34 and on fixed structure outside of the loop or balloon formed by the strand b function to maintain the mechanism 34 in a fixed position in space.

After the strand a and b have been twisted together at the plying point P, the plied strand or cord c travels downwardly within the hollow shaft 21, emerging therefrom and traveling directly to a driven take-up capstan 54 from which it is forwarded to the above-mentioned take-up package 42. The capstan 54 is driven by power partially derived from a prime mover and partially derived from the energy of the rotating loop or balloon of strand b by the following mechanism.

Figure 5:
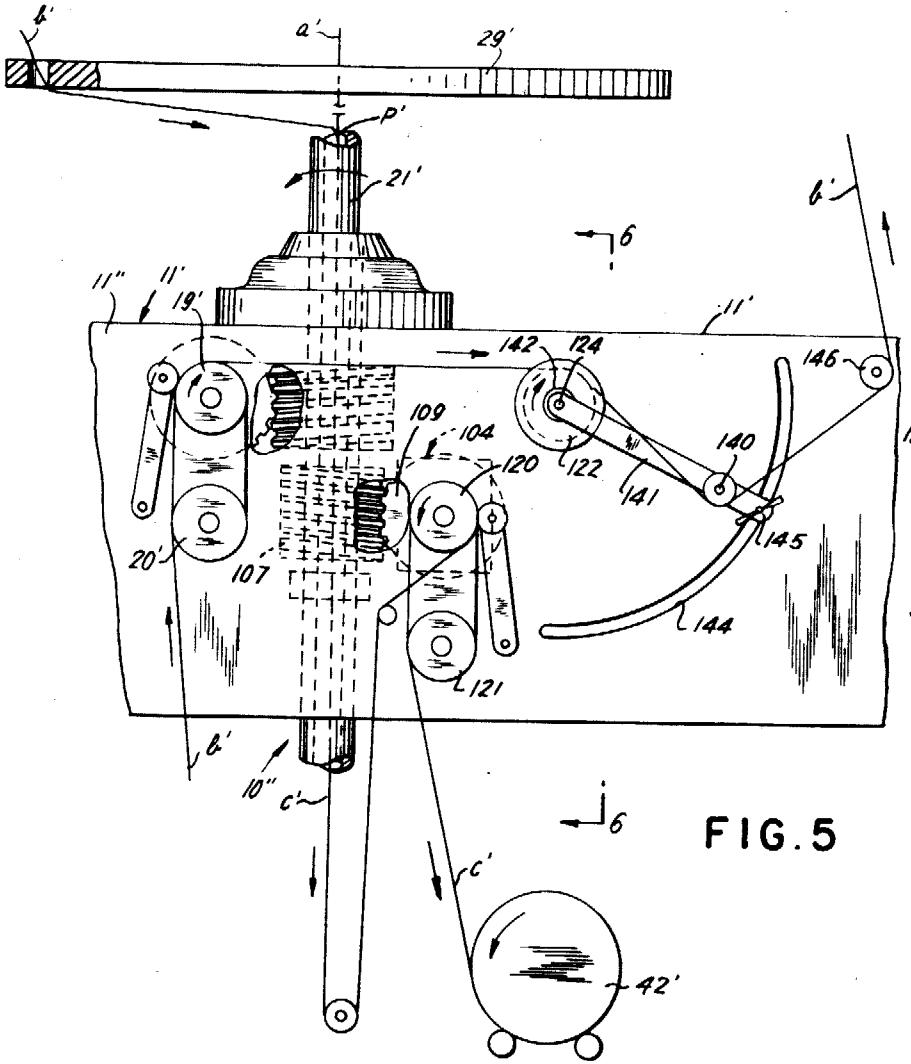
FIG. 5 is a fragmentary view partially in elevation and partially in section of a spindle incorporating an alternative tension sensitive device which may be employed with the cord-forming apparatus of FIG. 4.

A bowl-like member 55 similar to member 100 of FIG. 5 of my U.S. Patent No. 2,857,730, having a central downwardly directed sleeve portion 58 is rotatably mounted in a bearing 56 supported in the housing 57 in which the main shaft 21 of the spindle is rotatably mounted. Member 55 is of such depth and diameter as to contain the flier 29 therewithin, member 55 rising beyond the flier and then having its upper rim bent somewhat inwardly so as to have an upper annular rim or bead 59 which at least lightly engages the strand b of the loop or balloon when such loop or balloon is at its desired operative diameter.

It will be apparent that as the balloon increases in diameter the strand b thereof will engage the rim 59 of member 55 more forcibly, thereby tending to rotate member 55 more forcibly in the direction of rotation of the rotating loop or balloon 27. The energy thus derived from the rotating strand loop or balloon is employed to govern the speed of driving of the take-up capstan 54 in the following manner.

An annular gear 61 is secured to the central sleeve 58 of the bowl-like member 55 above the bearing 56. Meshing with gear 61 is a gear 62 which is fixed to a shaft 64 rotatably mounted in bearings 65 affixed to beam 11. Affixed to shaft 64 at a location beyond the lower bearing 65 is a further pinion 66 which meshes with a gear 67 affixed to a further shaft 68 which is rotatably supported in fixedly supported bearings and lies parallel to shaft 64. Affixed to gear 67 is a pinion 69 which meshes with a larger gear 70 affixed to a rotatable shaft 78. The gear sets 61, 62; 66, 67; and 69, 70 constitute speed reducing mechanism whereby the bowl-like member 55 rotates substantially faster than shaft 78 as it drives the latter; there is thus secured a substantial increase in driving torque from member 55 to shaft 78. Shaft 78 is connected in fixed driving relationship to one of the gears (76) (FIG. 2) of a differential gearing mechanism 73, the housing of which is fixedly supported as by being secured to the supporting frame of the spindle by means not shown.

Figure 2:
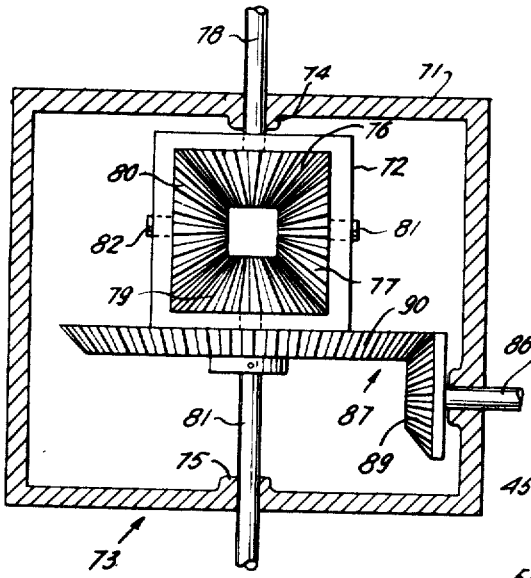
FIG. 2 is a view in section through the differential gear mechanism employed in the cord take-up of the apparatus of FIG. 1, the section being taken parallel to the plane of the paper of FIG. 1.

The differential gearing mechanism 73 is shown more particularly in FIG. 2. As there shown, such mechanism has a housing 71 within which a cage 72 is journalled between opposed bearings 74 and 75. Journalled on cage 72 are four similar serially meshing miter gears 76, 77, 79, and 80 disposed in the form of a closed figure. Gears 76 and 79 are oppositely disposed coaxially of the bearings 74 and 75 for the cage, such gears being journalled on the cage for independent rotation with respect to the cage. Gears 77 and 80 are oppositely disposed in alignment with their axes of rotation transverse to the axis of rotation of the cage in its bearings 74, 75. Gears 77 and 80 are journalled on the cage 72 on stub shafts 81 and 82, respectively, whereby such gears are carried with the cage in the rotation of the latter.

The gear 79, which is aligned with gear 76, is connected in fixed driving relationship to the take-up capstan 54 by a shaft 81 fixedly connected to gear 79, shaft 81 being connected to roll 91 of capstan 54. It is thus apparent that the bowl-like member 55 is drivingly connected to one branch of the differential gearing mechanism, and that the take-up capstan 54 is drivingly connected to the other branch of the differential gearing mechanism. When the cage 72 of such mechanism is driven at constant speed, the bowl-like member thus exerts a governing effect upon the speed of rotation of the take-up capstan 54, and thus the speed of take-up of the plied cord. The take-up capstan further includes an idle roll 91a, the cord c being wound in multiple wraps around rolls 91 and 91a. An idle presser roll 92 is shown mounted upon a pivotally supported arm 94 which is urged by spring means (not shown) to thrust roll 92 against the cord on roll 91.

In the embodiment shown, the cage 72 is driven from the main shaft 21 of the spindle 10 through gearing including a worm 84, and a shaft 86 suitable journalled in fixed structure of the spindle (not shown) and fixedly connected at one end to worm gear 85, which meshes with worm 84. The other end of shaft 86 is geared to cage 72 through a miter gear set 87 including a pinion 89 on shaft 86 and a bevel ring gear 90 surrounding and affixed to cage 72, as shown.

Figures 3, 4:
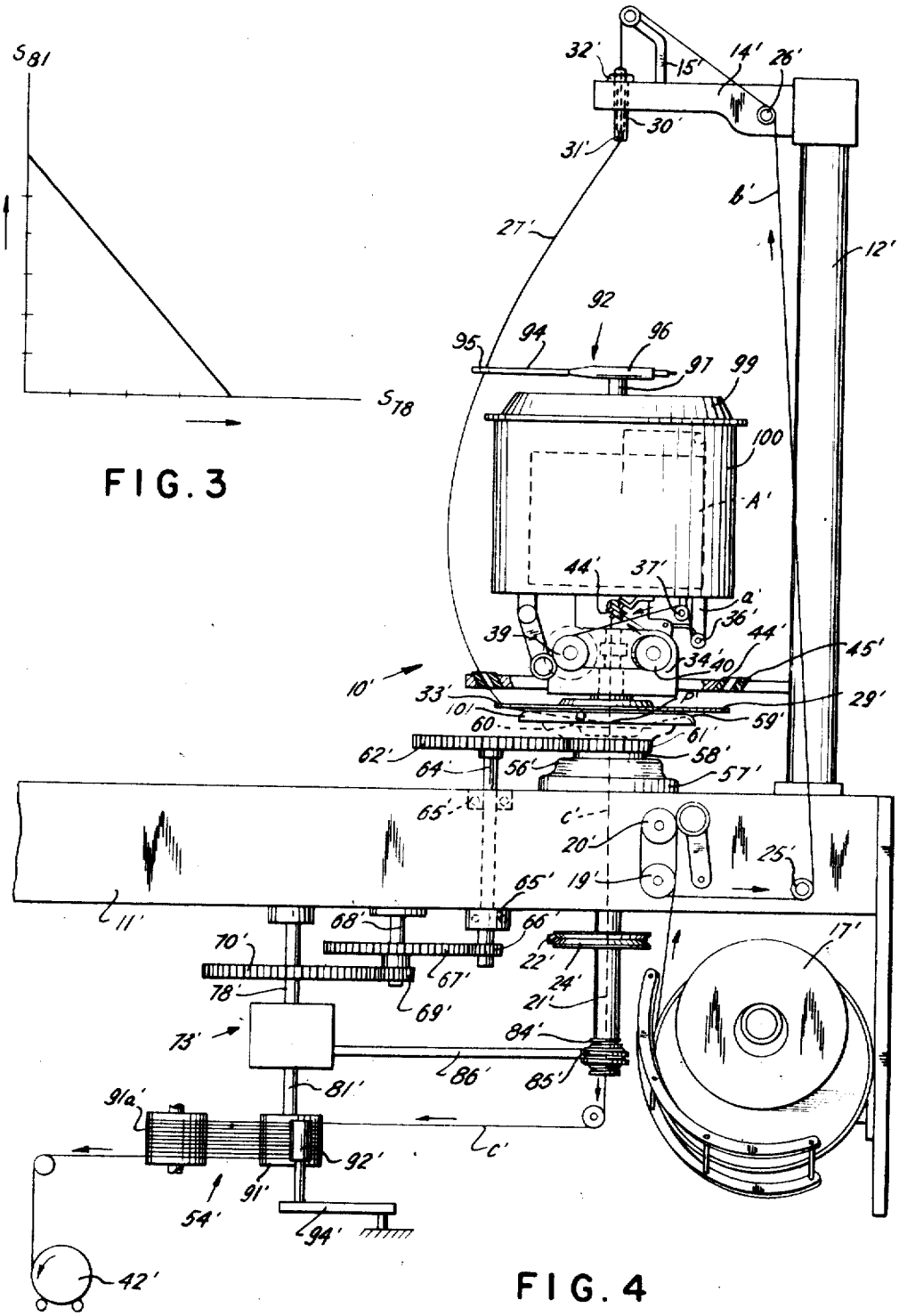
FIG. 3 is a graph plotting the speed of rotation of one branch shaft of the differential gearing mechanism employed in the embodiments of FIGS. 1, 2, 3, and 4 against the speed of rotation of the other branch shaft of such differential gearing mechanism.
FIG. 4 is a view in elevation of a plying spindle incorporating a second embodiment of cord take-up arrangement in accordance with the invention.

The manner in which the spindle 10 functions to control the size of the balloon will be more readily apparent upon consideration of the graph of FIG. 3. In such graph, the speed of rotation of shaft 78 connected to the bowl-like member 55 is represented by the abscissa $S_{78}$, whereas the speed of rotation of shaft 81 which drives the take-up capstan 54 is represented by the ordinate $S_{81}$. As is well known, the sum of speeds of the branch shafts of a differential gearing mechanism of the type described is equal to twice the speed of the cage. Such sum is a constant when the cage of the mechanism is driven at constant speed. The plot of $S_{78}$ against $S_{81}$ is therefore a straight line inclined upwardly toward the ordinate in the first quadrant, that is, as $S_{78}$ increases, $S_{81}$ decreases, and vice versa. The values of the speed ratios of the various gear sets, effective diameter of the rim 59 of the bowl-like member 55, etc., are so chosen that when the rotating loop or balloon 27 is of the desired diameter the rim 59 travels at a speed which somewhat exceeds the speed in its orbit of the portion of the strand of the rotating loop or balloon which contacts such rim. The strand thus functions as a brake upon the bowl-like member 55, the rim of the member 55 slipping past the strand at a predetermined rate. At the assume condition of the balloon, therefore, $S_{78}$ has a predetermined value and $S_{81}$ has a predetermined value which just satisfies the requirement for the speed of driving of the take-up capstan 54 to maintain the balloon of the desired size and to produce a plied cord c having equal lengths of the singles strands a and b therein.

The loop or balloon 27, in the embodiment of spindle shown, runs with its bulge or maximum diameter above the flier. With a singles strand b of uniform weight per unit length, when the loop or balloon 27 increases in diameter, the tension is strand b in the balloon decreases, and vice versa. The plying point P thus tends to correct variations in balloon diameter, since with an increase in balloon diameter the singles strand a tends to become the core, whereby to absorb more of strand b into the plied cord c, thereby to restore the balloon to its predetermined desired diameter. The reverse action takes place when the balloon tends to decrease in diameter.

Under such condition of uniform weight per unit length of strand b, the described variable speed take-up mechanism of spindle 10 aids the plying point P in the maintenance of a stable balloon of predetermined diameter. Thus when the balloon increases in diameter, the strand b therein contacts the rim 59 of member 55 more forcibly, thus decreasing the speed of rotation of member 55 and of shaft 78. As a consequence, shaft 81 and capstan 54 driven thereby increase in speed, and the cord c is pulled more forcibly and at an increased speed away from the plying point. This increases the tendency of strand a to become the core, and thus adds to the property of the plying point in restoring the balloon to the desired diameter. Member 55 operates in a reverse manner, should the balloon decrease in size, to decrease the speed of take-up of cord c by capstan 54, thereby aiding to restore the balloon to the desired diameter.

When the weight per unit length of the strand b varies sufficiently, however, the plying point P by itself is unable to restore the balloon to its optimum operating diameter. Thus when the weight per unit length of strand b increases substantially, strand b tends to become the core of the resulting cord, and thus tends to cause the balloon to increase in diameter. The resulting more forcible contact between the rim 59 of member 55, however, retards member 55 and causes the take-up capstan 54 to rotate faster to pull the cord c more forcibly away from the plying point P. This causes the strand a to tend to become the core, so that more of strand b is absorbed into the cord and the balloon is restored to its predetermined desired diameter.

The second embodiment of plying spindle, shown in FIG. 4, is generally similar to that of FIGS. 1 and 2, except that it employs an auxiliary flyer, and uses a shallowly dished disc engaging the outer ballooned strand beyond the flyer to furnish a portion of the driving energy for, and to govern the speed of, driving of the cord take-up capstan. Accordingly, parts in FIG. 4 which are similar to those in FIGS. 1 and 2 are designated by the same reference characters but with an added prime.

In the embodiment shown in FIG. 4, there is provided an idle auxiliary flyer, generally designated 92, similar to that designated 130 in applicant's U.S. Patent No. 3,153,893. Such auxiliary flyer has a radial arm 94 with a guiding eye 95 at its outer end, eye 95 guidingly receiving the strand b′ at a location intermediate the height of balloon 27. The auxiliary flyer has a central body portion 96 which is rotatably mounted in a bearing means 97 secured to the lid 99 of a protective shell member 100 which surrounds the inner strand package A′ on support 34′. Member 100 is supported on package support 34′, as shown.

After the strands a′ and b′ have been twisted together at the plying point P′, the plied strand or cord c′ travels downwardly within the hollow shaft 21′, emerging therefrom and traveling directly to a driven take-up capstan 54′ from which it is forwarded to the take-up package 42′. The capstan 54′ is driven by a differential gearing mechanism under the control of the rotating loop or balloon of strand b′ by the following mechanism. A dish-like disc 101 having a central downwardly directed sleeve portion 58′ is rotatably mounted in a bearing 56′ supported in the housing 57′ in which the main shaft 21′ of the spindle is rotatably mounted. The rim 59′ of disc 55′ is rounded and downwardly bent at its upper edge, the upper surface of rim 59′ lying somewhat above the path of the strand b′ between eye 33′ on the flyer 29′ and the passage in shaft 21′ leading to the plying point P′. A guide roll 60 is shown mounted on shaft 21′ at the outer end of such passage in shaft 21′. The portion of strand b′ in such run thereof accordingly engages the rim 59′ of disc 55′ with a force which is a direct function of the tension in such portion of strand b′. Such engagement between the strand b′ and the edge of the disc 55′ tends to carry the disc with the strand as the latter rotates with the flyer. The energy thus derived from the rotating strand loop is employed to govern the speed of driving by the differential gearing mechanism 73′.

The tension conditions existing in the system of FIG. 4 differ from those in the system of FIGS. 1 and 2 in that in FIG. 4 when the diameter of the balloon increases for any reason, whether the weight per unit length of strand b′ remains constant or increases, the tension in strand b′ increases, and that when the diameter of the balloon decreases for any reason, under either of such conditions, the tension in strand b′ decreases. Thus when the diameter of balloon 27′ increases, disc 101, which rotates faster than the balloon, is slowed by more forceful contact of strand b′ with it. Consequently, the take-up capstan 54′ is then driven at a higher speed by differential gearing mechanism 73′, thereby to return the balloon 27′ to its optimum diameter. When the balloon decreases in diameter, strand b′ engages disc 101 less forcibly, so that the disc 101 rotates at an increased speed. As a result, the take-up capstan 54′ is driven at a slower speed, and the balloon is thus permitted to increase to its optimum diameter.

Figure 6:
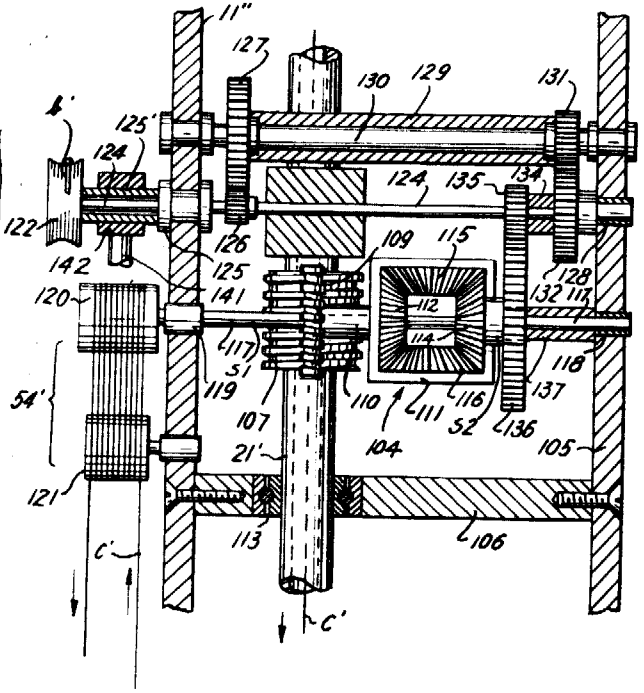
FIG. 6 is a view in transverse section through the cord take-up mechanism, the section being taken generally along line 6—6 of FIG. 5.

In the embodiment of FIGS. 5 and 6 the spindle 10″ is generally similar to that of FIG. 4. The parts of spindle 10″ which are similar to those of FIG. 4 are thus designated by the same reference characters as in FIG. 4. Spindle 10″ employs an auxiliary flyer (not shown), similar to auxiliary flyer 92 of FIG. 4, whereby the tension in strand b′ in the zone thereof between its constant speed feeding capstan and the balloon increases when the balloon increases in diameter, and such tension decreases when the balloon decreases in diameter. This phenomenon is employed to govern the speed of driving of the cord take-up capstan, an externally mounted tension sensitive roller, which engages such portion of strand b′, being connected to a branch shaft of the differential gearing mechanism to govern the speed of driving of the cord take-up capstan.

In the fragmentarily shown spindle of FIGS. 5 and 6 there is employed a differential gearing mechanism generally designated 104 and shown more particularly in FIG. 6. Such mechanism is shown, in this construction, mounted on the rear of the forward vertical part 11″ of the beam 11′ forming a part of the framework of the spindle. Mechanism 104 has a housing including a part of member 11″, a horizontal lower plate 106, and a vertical rear plate 105. The plate 105 is tied to plate 11″ at the top of the former by a fixed shaft 130, to be further described.

The main shaft 21′ of the spindle is journalled in part in a bearing 113 in lower plate 106 of the housing. Shaft 21′ has a worm 107 affixed thereto, worm 107 meshing with a worm gear 109 affixed to the forward end of a sleeve 110 which is journalled upon a cross shaft 117 extending through the differential mechanism 104 and between and journalled in plate portion 11″ and the rear plate 105. Affixed to the rear end of sleeve 110 is the cage 111 of the differential gearing mechanism proper; thus the shaft 21′ drives cage 111 in synchronism therewith. Mounted within cage 111 are four serially meshing miter gears, as shown, gears 112 and 114 being aligned and oppositely disposed coaxial with shaft 117, and gears 115 and 116 being journalled on stub shafts (not shown) affixed to cage 111 and disposed transverse to the axis of shaft 117.

The above-mentioned shaft 117, which is journalled in bears 118 and 119 in members 105 and 11″, respectively, is affixed to gear 112 and thus driven thereby. Fixedly mounted on shaft 117 forwardly of plate portion 11″ is a driven capstan roll 120 which with an opposed slightly canted idle roll 121 spaced therebelow froms a variable speed take-up capstan 54′ for the plied cord c′. As shown in FIG. 5, roll 120 rotates counterclockwise in taking up the plied cord c′. As shown, the cord c′ is brought around capstan rolls 120 and 121 in multiple wraps, finally being led to a take-up package 42′, which in the embodiment shown is of the frictionally rim driven type. The multiple turns of the cord c′ on roll 120 are maintained in firm, substantially non-slipping contact with such roll by a spring pressed idle roller, as shown.

The variable speed take-up mechanism for cord c′ is under the control of a tension sensitive roll 122 which frictionally engages the singles strand b′ and causes such strand to travel in a salient path partially thereabout in a zone of such singles strand located between the constant speed capstan 19′, 20′ therefor and the balloon into which the strand is fed. In the illustrative embodiment roll 122 rotates clockwise (FIG. 5) at a surface speed higher than the speed of strand b′ thereover. Roll 122 is fixedly secured to a shaft 124 which extends between and is journalled in bearings 125 and 128 in plate portion 11″ and plate 105, respectively. A pinion 126 fixed to shaft 124 meshes with a larger spur gear 127 affixed to the forward end of a sleeve 129 which is rotatably mounted on the above-mentioned fixed shaft 130. To the opposite, rear end of sleeve 129 there is fixed a pinion 131 which meshes with a larger spur gear 132 affixed to a sleeve 134 which is rotatably mounted on shaft 124. Also affixed to sleeve 134 is a pinion 135 which meshes with a large spur gear 136. Gear 136 is affixed to a sleeve 137, which is rotatably mounted on the rear end of shaft 117. The forward end of sleeve 137 is affixed to and thus rotates with the miter gear 114 of the differential gearing mechanism, gear 114 and sleeve 137 rotating with respect to the shaft 117 which extends through them.

The angle of lap of the singles strand b′ about the roll 122 is preferably made adjustable, whereby the spindle may readily be made to handle and ply strands of different material having different coefficients of friction with roll 122. For this purpose, there is provided an idle guide roller 140 which is journalled on an arm 141 affixed at one end to a sleeve 142 which is rotatable about a sleeve 125′ affixed to and projecting forwardly from bearing 125. Preferably, sleeve 125′ is radially spaced from shaft 124 so as not to impose any drag on such shaft. The other end of arm 141 is held at a desired angle by a clamping device 145 which cooperates with an arcuate slot 144 in frame portion 11″ coaxial of shaft 124. From roller 140 the strand b′ is fed to a fixed guide roller 146, and thence upwardly to the apex guide for the balloon.

It will be apparent from the above that the take-up capstan 54′ for the plied cord c′ is driven by the main shaft 21′ of the spindle 10′, the speed of driving of such capstan 54′ being variable and under the control of the tension sensitive roll 122. The differential gearing mechanism shown has the inherent properties (1) that the algebraic sum of the speeds, $S_1$ and $S_2$ of the branch shafts 117 and (sleeve) 137, respectively, is a contant when the cage of the differential gearing mechanism is driven at a constant speed $S_1+S_2$, and (2) that the driving torque applied to the cage 111 is divided equally at all times between roll 120, affixed to shaft 117, and sleeve 137. The torque applied to roll 122 by singles strand b′, however, is multiplied by the gear sets 126, 127; 131, 132; and 135, 136. Thus a relatively small torque applied to roll 122 by singles strand b′ will balance a much larger torque applied to roll 120 by the plied cord c′ which it takes up.

In an illustrative embodiment of the spindle 10′, when roll 120 of the cord take-up capstan is driven at a predetermined speed which maintains the balloon of a predetermined desired size and under a predetermined optimum tension, the tension sensitive roll 122 rotates in a strand forwarding direction but at a speed which very substantially exceeds the speed of travel of the singles strand b′ into the balloon. The retarding torque imposed upon roll 122 by strand b′, multiplied by the speed increase provided by gear sets 126, 127, etc., is then equal to the torque imposed upon roll 120 of capstan 54′ by the plied cord c′.

If, however, the balloon should increase in diameter, the tension in singles strand b′ increase, thereby imposing a greater retarding torque upon roll 122 and causing such roller to rotate more slowly. By reason of properties (1) and (2) above of the differential gearing mechanism, the speed of roll 120 of take-up capstan 54′ increases, and the force which it exerts upon cord c′ increases. Such increased speed of take-up of the cord under increased force causes the inner singles strand a′ to end to become the core of the cord, and thus causes the balloon to be reduced in diameter until the tension therein is restored to said predetermined optimum value. The spindle controlling mechanism functions in the reverse manner to restore the tension in the balloon to such optimum value when balloon diameter and tension decrease unduly.

Although the invention has been illustrated in connection with its use in a plying spindle of the skip type, it is to be understood that the balloon controlling and take-up features of the invention may be employed to advantage in a variety of twisting spindles of the balloon-creating type. Thus the balloon control and take-up mechanism can be used with a balloon-creating false twister, or with a two-for-one downtwister, the take-up capstans for such other twisters being drivingly connected to a branch shaft of the differential gearing mechanism in the same manner as the take-up capstans in the illustrative embodiments of the apparatus.

Although a limited number of embodiments of the invention have been illustrated in the accompanying drawings and described in the foregoing specifications, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What is claimed is:

1. In apparatus for twisting together two strands to form a two-ply cord having a source of supply of a first strand, means to rotate a second strand in a loop about the source of supply of the first strand, a first means to feed the first strand at substantially constant speed toward a plying point, a second means to feed the second strand into the loop, and a third, variable speed means for feeding the plied cord to withdraw it under tension from the plying point, the improvement which comprises a first, driving shaft and a second and third differentially connected shafts driven by the first shaft, means for driving the first shaft at constant speed, means drivingly connecting the second shaft to the third feeding means, and means responsive to variations in the tension in the second strand in a zone thereof between the second feeding means and the plying point for varying the speed of rotation of the third shaft, whereby to increase the tension imposed upon the cord by the third feeding means when the tension in the second strand at such zone thereof increases, and to decrease the tension imposed upon the cord by the third feeding means when the tension in the second strand at such zone thereof decreases.

2. In apparatus for twisting together two strands to form a two-ply cord having a source of supply of a first strand, means to rotate a second strand in a loop about the source of supply of the first strand, a first means to feed the first strand at substantially constant speed toward a plying point, a second means to feed the second strand into the loop, and a third, variable speed means for feeding the plied cord to withdraw it under tension from the plying point, the improvement which comprises a first, driving shaft and a second and third differentially connected shafts driven by the first shaft, means for driving the first shaft at constant speed, means drivingly connecting the second shaft to the third feeding means, and means responsive to variations in size of the loop for varying the speed of rotation of the third shaft, whereby to increase the tension imposed upon the cord by the third feeding means when the loop increases in size, and to decrease the tension imposed upon the cord by the third feeding means when the loop decreases in size.

3. Apparatus as claimed in claim 2, wherein the means responsive to variations in size of the loop comprises means receiving a force generated by the loop in its rotation.

4. Apparatus as claimed in claim 2, wherein the means responsive to variations in size of the loop comprises means engaged by the second strand and receiving energy therefrom.

5. Apparatus as claimed in claim 4, wherein the means engaged by the second strand comprises a rotatable member engaging and receiving torque from the second strand in its travel through a zone thereof between the second feeding means and the plying point.

6. Apparatus as claimed in claim 5, comprising speed-reducing means interposed between the rotatable member and the third shaft, whereby the rotatable member rotates at an appreciably higher speed than the third shaft.

7. In apparatus for twisting together two strands to form a two-ply cord having a source of supply of a first strand, means to rotate a second strand in a loop about the source of supply of the first strand, a first means to feed the first strand at substantially constant speed toward a plying point, a second means to feed the second strand at substantially constant speed into the loop, and a third, variable speed means for feeding the plied cord to withdraw it under tension from the plying point, the improvement which comprises a first, driving shaft and a second and third differentially connected shafts driven by the first shaft, means for driving the first shaft at constant speed, means drivingly connecting the second shaft to the third feeding means, and means responsive to variation in the tension in the second strand in a zone thereof between the second feeding means and the plying point for varying the speed of rotation of the third shaft, whereby to increase the tension imposed upon the cord by the third feeding means when the tension in the second strand at such zone thereof increases, and to decrease the tension imposed upon the cord by the third feeding means when the tension in the second strand at such zone thereof decreases.

8. In apparatus for twisting together two strands to form a two-ply cord having a source of supply of a first strand, means to rotate a second strand in a loop about the source of supply of the first strand, a first means to feed the first strand at substantially constant speed toward a plying point, a second means to feed the second strand at substantially constant speed into the loop, and a third, variable speed means for feeding the plied cord to withdraw it under tension from the plying point, the improvement which comprises a first, driving shaft and a second and third differentially connected shafts driven by the first shaft, means for driving the first shaft at constant speed, means drivingly connecting the second shaft to the third feeding means and means responsive to variations in size of the loop for varying the speed of rotation of the third shaft, whereby to increase the tension imposed upon the cord by the third feeding means when the loop increases in size, and to decrease the tension imposed upon the cord by the third feeding means when the loop decreases in size.

9. In apparatus for twisting together two strands to form a two-ply cord having a source of supply of a first strand, means to rotate a second strand in a loop about the source of supply of the first strand, a first means to feed the first strand at substantially constant speed toward a plying point, a second means to feed the second strand into the loop, and a third, variable speed means for feeding the plied cord to withdraw it under tension from the plying point, the improvement which comprises a differential gearing mechanism having a first, driving shaft and second and third differentially connected shafts driven by the first shaft, the differential gearing mechanism dividing the torque applied thereto equally between the second and third shafts, means for driving the first shaft at constant speed, means drivingly connecting the second shaft to the third feeding means, a rotatable member engaging and receiving torque from a zone of the second strand between the second feeding means and the plying point, and means drivingly connecting said rotatable member to the third shaft, the speed of rotation of the rotatable member varying upon variations of torque imposed thereon by the second strand, whereby the speeds of the member and the third shaft connected thereto vary and in turn vary the speed of the third feeding means inversely to the variation in speed of the member.

10. In apparatus for twisting together two strands to form a two-ply cord having a source of supply of a first strand, means to rotate a second strand in a loop about the source of supply of the first strand, a first means to feed the first strand at substantially constant speed toward a plying point, a second means to feed the second strand at substantially constant speed into the loop, and a third, variable speed means for feeding the plied cord to withdraw it under tension from the plying point, the improvement which comprises a differential gearing mechanism having a first driving shaft and second and third differentially connected shafts driven by the first shaft, the differential gearing mechanism dividing the torque applied thereto equally between the second and third shafts, means for driving the first shaft at constant speed, means drivingly connecting the second shaft to the third feeding means, a rotatable member engaging and receiving torque from a zone of the second strand between the second feeding means and the plying point, and means drivingly connecting said rotatable member to the third shaft, the speed of rotation of the rotatable member varying upon variation of the torque imposed thereon by the second strand, whereby the speeds of the member and the third shaft connected thereto vary and in turn vary the speed of the third feeding means inversely to the variation in speed of the member.

11. Apparatus as claimed in claim 10, wherein the differential gearing mechanism is such that the value of one half the algebraic sum of the speeds of the second and third shafts is proportional to the speed of the first shaft.

12. Apparatus as claimed in claim 10, comprising speed reducing means interposed between the rotatable member and the third shaft, whereby the rotatable member rotates at an appreciably higher speed than the third shaft.

13. Apparatus as claimed in claim 10, wherein the differential gearing mechanism comprises a frame drivingly connected to the first shaft, two first pinions rotatably mounted on the frame and drivingly connected to the respective second and third shafts, and at least one further, second pinion mounted on the frame so as to rotate as a whole therewith and meshing with and coupling said first pinions.

14. In apparatus for twisting together two strands to form a two-ply cord having a source of supply of a first strand, means to rotate a second strand in a loop about the source of supply of the first strand, a first means to feed the first strand at substantially constant speed toward a plying point, a second means to feed the second strand at substantially constant speed into the loop, and a third, variable speed means for feeding the plied cord to withdraw it under tension from the plying point, the improvement which comprises a first driving shaft and second and third differentially connected shafts driven by the first shaft, means for driving the first shaft at constant speed, means drivingly connecting the second shaft to the third feeding means, and means responsive to variations in size of the loop for variably driving the third shaft, whereby to increase the tension imposed upon the cord by the third feeding means when the loop increases in size, and to decrease the tension imposed upon the cord by the third feeding means when the loop decreases in size.

15. Apparatus as claimed in claim 14, wherein the means responsive to variations in size of the loop comprises means receiving a force generated by a zone of the loop in its rotation.

16. Apparatus as claimed in claim 14, wherein the means responsive to variations in size of the loop comprises means engaged by the loop in its rotation and receiving energy therefrom.

17. Apparatus as claimed in claim 14, wherein the means engaged by the loop comprises a member mounted for rotation coaxially of the loop and engaging and receiving torque from a zone of the rotating loop.

18. Apparatus as claimed in claim 17, comprising speed-reducing means interposed between the rotatable member and the third shaft, whereby the rotatable member rotates at an appreciably higher speed than the third shaft.

19. In apparatus for twisting together two strands to form a two-ply cord having a source of supply of a first strand, means to rotate a second strand in a loop about the source of supply of the first strand, a first means to feed the first strand at substantially constant speed toward a plying point, a second means to feed the second strand at substantially constant speed into the loop, and a third, variable speed means for feeding the plied cord to withdraw it under tension from the plying point, the improvement which comprises a differential gearing mechanism having a first, driving shaft and second and third differentially connected shafts driven by the first shaft, the differential gearing mechanism driving the torque applied thereto equally between the second and third shafts, means for driving the first shaft at constant speed, means drivingly connecting the second shaft to the third feeding means, a member mounted for rotation coaxially of the loop and engaging and receiving torque from a zone of the rotating loop, and means drivingly connecting said rotatable member to the third shaft, the rotatable member having a speed of rotation somewhat different from that of the rotating loop, whereby the loop transmits a variable torque to the member and the third shaft connected thereto and varies the speed of the third feeding means inversely to the variation in speed of the member.

20. Apparatus as claimed in claim 19, wherein the differential gearing mechanism is such that the value of one half the algebraic sum of the speeds of the second and third shafts is proportional to the speed of the first shaft.

21. Apparatus as claimed in claim 20, wherein the differential gearing mechanism comprises a frame drivingly connected to the first shaft, two first pinions rotatably mounted on the frame and drivingly connnected to the respective second and third shafts, and at least one further, second pinion mounted on the frame so as to rotate as a whole therewith and meshing with and coupling said first pinions.

22. Apparatus as claimed in claim 20, wherein the apparatus has a driven main shaft and a flyer connected thereto for rotating the loop, and wherein the rotatable member engages a zone of the loop outwardly of the flyer.

23. Apparatus as claimed in claim 20, wherein the apparatus has a driven main shaft and a flyer connected thereto with means thereon for rotating the loop, and wherein the rotatable member engages a zone of the loop inwardly of the loop rotating means of the flyer.

24. Apparatus as claimed in claim 20, comprising speed-reducing means interposed between the rotatable member and the third shaft, whereby the rotatable member rotates at an appreciably higher speed than the third shaft.

25. In apparatus for twisting together two strands to form a two-ply cord having a source of supply of a first strand, means to rotate a second strand in a loop about the source of supply of the first strand, a first means to feed the first strand at substantially constant speed toward a plying point, a second means to feed the second strand at substantially constant speed into the loop, and a third, variable speed means for feeding the plied cord to withdraw it under tension from the plying point, the improvement which comprises a first driving shaft and second and third differentially connected shafts driven by the first, shaft, means for driving the first shaft at constant speed, means drivingly connecting the second shaft to the third feeding means, and means responsive to variations in the tension of the second strand between the second feeding means and the loop for variably retarding the third shaft, whereby to increase the tension imposed upon the cord by the third feeding means when said tension of the second strand increases, and to decrease the tension imposed upon the cord by the third feeding means when said tension of the second strand decreases.

26. Apparatus as claimed in claim 25, wherein the means responsive to variations in size of the loop comprises tension sensitive means engaged by the second strand in the zone thereof between the second feeding means and the loop.

27. Apparatus as claimed in claim 25, wherein the means responsive to variations in size of the loop comprises tension sensitive means engaged by said second strand in the zone thereof between the second feeding means and the loop, said means forming a salient zone of constant length in the second strand.

28. Apparatus as claimed in claim 27, wherein the tension sensitive means engaged by the said zone of the second strand comprises a rotatable member mounted for tangential engagement by the said zone of the second strand and receiving torque therefrom as the second strand travels therepast.

29. Apparatus as claimed in claim 28, comprising speed-reducing means interposed between the rotatable member and the third shaft, whereby the rotatable member rotates at an appreciably higher speed than the third shaft.

30. In apparatus for twisting together two strands to form a two-ply cord having a source of supply of a first strand, means to rotate a second strand in a loop about the source of supply of the first strand, a first means to feed the first strand at substantially constant speed toward a plying point, a second means to feed the second strand at substantially constant speed into the loop, and a third, variable speed means for feeding the plied cord to withdraw it under tension from the plying point, the improvement which comprises a differential gearing mechanism having a first, driving shaft and second and third differentially connected shafts driven by the first shaft, the differential gearing mechanism dividing the torque applied thereto equally between the second and third shafts, means, a rotatable member having a circular zone coaxial drivingly connecting the second shaft to the third feeding means, a rotatable member having a circular zone coaixal of the axis of rotation of the member, said circular zone tangentially engaging and receiving torque from a zone of the second strand between the second feeding means and the loop, and means drivingly connecting said rotatable member to the third shaft, the circular zone of the rotatable member having a surface speed somewhat different from that of the said zone of the second strand engaging such zone, and said zone of the second strand having variable driving relationship with the third shaft connected thereto, whereby to vary the speed of the third feeding means inversely to the variation in speed of the rotatable member.

31. Apparatus as claimed in claim 30, wherein the differential gearing mechanism is such that the value of one half the algebraic sum of the speeds of the second and third shafts is proportional to the speed of the first shaft.

32. Apparatus as claimed in claim 31, comprising speed-reducing means interposed between the rotatable member and the third shaft, whereby the rotatable member rotates at an appreciably higher speed than the third shaft.

33. Apparatus as claimed in claim 32, wherein the differential gearing mechanism comprises a frame drivingly connected to the first shaft, two first pinions rotatably mounted on the frame and drivingly connected to the respective second and third shafts, and at least one further, second pinion mounted on the frame so as to rotate as a whole therewith and meshing with and coupling said first pinion.

34. In strand-twisting apparatus, in combination, mechanism for rotating a strand in the form of a loop, mechanism for controlling the size of the loop comprising a first means to feed the strand into the loop, a second means to feed the strand out of the loop, one of said first and second feeding means being adapted to be driven at variable speeds to vary its strand feeding effect, a first, driving shaft and second and third differentially connected shafts driven by the first shaft, means for driving the first shaft at constant speed, means drivingly connecting the second shaft to the variable speed feeding means, and means responsive to variations in the tension of the strand in the loop for varying the speed of rotation of the third shaft, whereby to increase the speed of feeding of the variable speed feeding means when the loop increases in size, and to decrease the speed of feeding of the variable speed feeding means when the loop decreases in size.

35. Apparatus as claimed in claim 34, wherein the second feeding means is driven at variable speed.

36. Apparatus as claimed in claim 35, wherein the first feeding means [forwards the strand at constant speed into the loop.] *is driven at constant speed.*

*37. In strand-twisting apparatus wherein a strand travels from a source of supply to a strand take up means, in combination, mechanism for rotating the travelling strand in the form of a loop, mechanism for controlling the tension of the strand in the loop comprising a first means to feed the strand in a first run thereof toward the loop, a second means for withdrawing the strand in a second run thereof from the loop, one of said first and second means including means adapted to be driven at variable speed to vary the speed of feeding of the respective one of the runs of strand, a first, driving shaft and second and third differentially connected shafts driven by the first shaft, means for driving the first shaft at constant speed, means drivingly connecting the second shaft to the variable speed means, and means responsive to variations in the tension of the other run of strand for varying the speed of rotation of the third shaft.*

*38. Apparatus as claimed in claim 37, wherein the tension in said other run of strand varies with changes of tension of the strand in the loop.*

*39. Apparatus as claimed in claim 37, wherein the means responsive to variations in the tension of a strand for varying the speed of rotation of the third shaft includes means engaging one of said two runs of strand outwardly of and spaced from the loop.*

*40. Apparatus as claimed in claim 37, wherein the apparatus twists two strands together to form a two-ply strand, and comprising a source of supply about which the loop of the first mentioned strand rotates, and a third means for feeding the second strand at substantially constant speed toward a plying point, and wherein the strand in the second strand run is plied strand.*

*41. Apparatus as claimed in claim 40, wherein the tension in said other run of strand varies with changes of tension of the strand in the loop.*

*42. Apparatus as claimed in claim 41, wherein the means responsive to variations in the tension of a strand for varying the speed of rotation of the third shaft in-*

*cludes means engaging one of said two runs of strand outwardly of and spaced from the loop.*

References Cited

The following references, cited by the Examiner, are of record in the patented file of this patent or the original patent.

UNITED STATES PATENTS

| | | | |
|---|---|---|---|
| Re. 24,380 | 10/1957 | Vibber | 57—58.83 X |
| Re. 24,662 | 6/1959 | Vibber | 57—58.3 |

| | | | |
|---|---|---|---|
| 2,732,680 | 1/1956 | Vibber | 57—58.83 X |
| 2,811,012 | 10/1957 | Klein | 57—58.83 X |
| 2,857,730 | 10/1958 | Vibber | 57—58.83 X |
| 2,961,824 | 11/1960 | Klein | 57—58.83 X |
| 3,041,815 | 7/1962 | Vibber | 57—58.83 X |
| 3,153,893 | 10/1964 | Vibber | 57—58.3 |

DONALD E. WATKINS, Primary Examiner

U.S. Cl. X.R.

57—58.7, 58.83